United States Patent [19]
Hicks et al.

[11] 3,985,538
[45] Oct. 12, 1976

[54] PIPE REACTOR-CONTINUOUS AMMONIATOR PROCESS FOR PRODUCTION OF GRANULAR PHOSPHATES

[75] Inventors: Gordon C. Hicks, Sheffield; Fred E. Lancaster, Jr., Killen, both of Ala.

[73] Assignee: Tennessee Valley Authority, Muscle Shoals, Ala.

[22] Filed: May 16, 1975

[21] Appl. No.: 578,118

Related U.S. Application Data

[63] Continuation of Ser. No. Legol, Jr., Oct. 24, 1974, now Defensive Publication No. T940023.

[52] U.S. Cl................................... 71/34; 71/43; 71/64 DB; 423/309; 423/310; 159/45 R
[51] Int. Cl.²..................... C05B 7/00; B01D 1/16
[58] Field of Search.................. 71/34, 43, 64 DB; 423/309, 310; 159/45 R, 165, DIG. 10

[56] References Cited
UNITED STATES PATENTS

| | | | |
|---|---|---|---|
| 2,424,205 | 7/1947 | Otto | 159/165 X |
| 2,829,710 | 4/1958 | Paasch | 159/4 R X |
| 2,902,342 | 9/1959 | Kerley, Jr. | 71/43 X |
| 3,649,175 | 3/1972 | Legol, Jr. | 71/43 X |

*Primary Examiner*—Charles N. Hart
*Assistant Examiner*—Ferris H. Lander
*Attorney, Agent, or Firm*—Robert A. Petrusek

[57] ABSTRACT

Process for the production of granular mixed fertilizer in which ammonium phosphate melt is prepared in a pipe reactor and dispersed through a plurality of apertures in the wall of the pipe to bind small particles of fertilizer materials into granules. Wet-process phosphoric acid is ammoniated to an $NH_3:H_3PO_4$ mole ratio of about 1.0 and the steam formed by the heat of reaction atomizes the ammonium phosphate melt resulting in proper distribution of the melt for granulation. Up to about 30 percent of the $P_2O_5$ in the melt may be polyphosphate. The ammonium phosphate is essentially anhydrous and the granules of mixed fertilizers do not require drying. Elimination of drying greatly decreases investment, dust and fume evolution, and fuel requirement.

6 Claims, 1 Drawing Figure

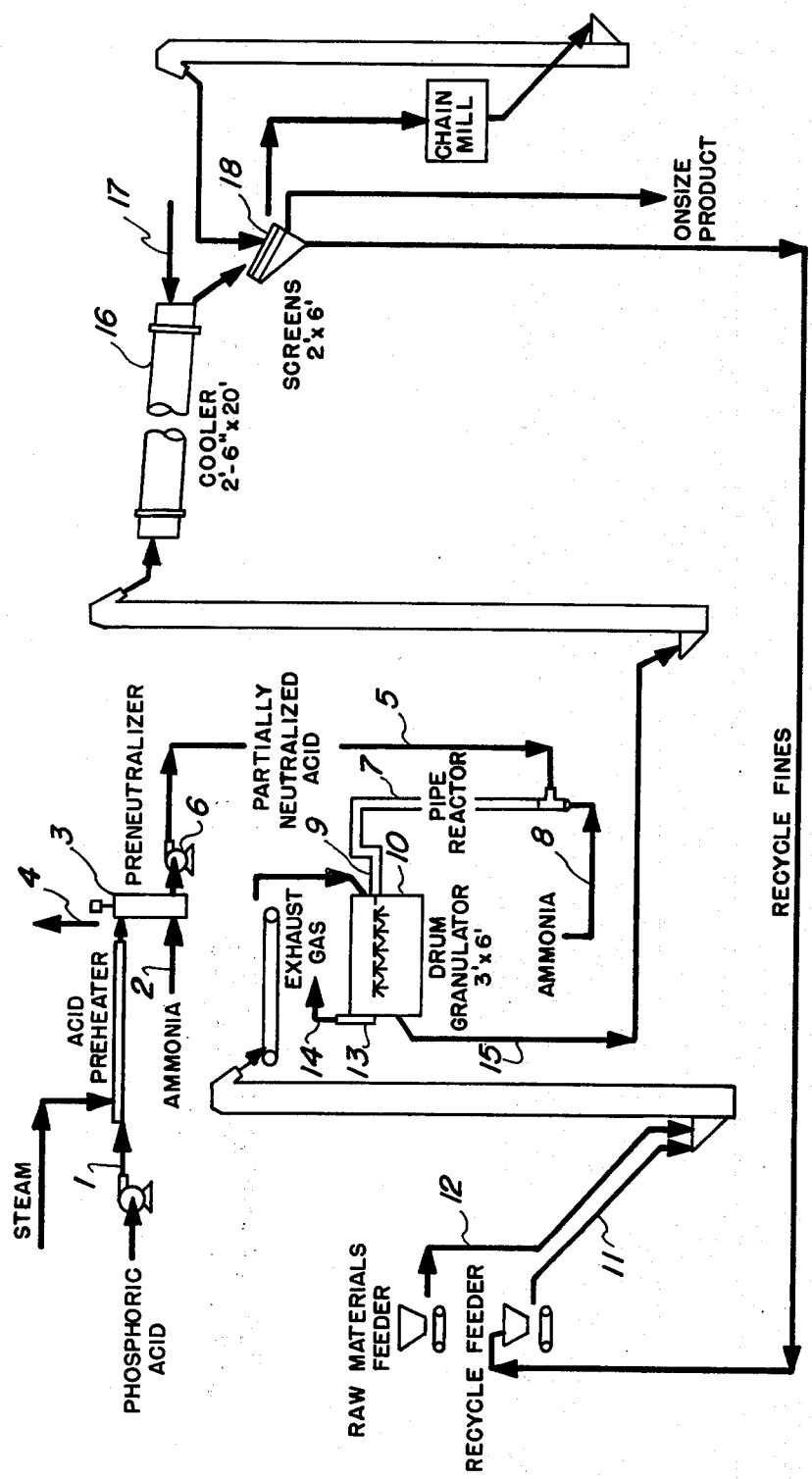

PIPE REACTOR-CONTINUOUS AMMONIATOR PROCESS FOR PRODUCTION OF GRANULAR PHOSPHATES

The invention herein described may be manufactured and used by or for the Government for governmental purposes without the payment to us of any royalty therefor.

This application is a continuation of copending application Ser. No. 517,452, filed Oct. 24, 1974, now Def. Publ. T940023, Nov. 4, 1975, for PIPE REACTOR-CONTINUOUS AMMONIATOR PROCESS FOR PRODUCTION OF GRANULAR PHOSPHATES.

The present invention relates to an improved process for the manufacture of granular mixed fertilizers; more particularly it relates to the manufacture of granular mixed fertilizers containing ammonium phosphate melt, which melt is produced in a pipe reactor, and still more particularly it relates to the manufacture of granular mixed fertilizers containing ammonium phosphate melt which melt is produced in a pipe reactor and serves to bond the fertilizer into granules, and even still more particularly it relates to the manufacture of granular mixed fertilizers containing ammonium phosphate melt which bonds and incorporates other fertilizer materials to yield NPK granules wherein previously required steps of drying of solid product is eliminated.

In many processes for granulation of mixed fertilizer now known in the art, such as those taught in U.S. Pat. No. 2,926,079, Smith, and U.S. Pat. No. 2,798,801, Kieffer, et.al., a drying step is required to remove excess moisture. The process of the present invention eliminates the need for a drying step. The process of the instant invention eliminates the need for a pressurization step as well as the requirement for special equipment, such as a dehydration chamber, as taught in U.S. Pat. No. 3,415,638, Hamsley et al.

In U.S. Pat. No. 3,733,191, Meline et al., assigned to the assignee of the present invention, there is shown an improved process for the production of ammonium Polyphosphate in molten anhydrous form from wet-process phosphoric acid and anhydrous ammonia. Up to about 30 percent of the $P_2O_5$ in the melt may be in poly form. The present invention is a result of a continuation of work on said Meline process. In the present process, we have found that a simple perforated pipe attached to the discharge end of the inline reactor results in effective disengagement of vapor from the melt without foaming and in much improved distribution of the ammonium phosphate melt in the granulation stage, thereby further improving the process by eliminating the need for Meline's tube-and-rotor vapor disengager or any other mechanical-type vapor disengager. The perforated pipe provides adequate back pressure to allow efficient reaction in a very short time. The successful use of the perforated pipe greatly improves prospects for use of this process on a commercial scale in the large number of existing fertilizer granulation plants.

Heretofore, one way to make granular mixed fertilizer using molten ammonium (poly) phosphate was to simultaneously add concentrated urea solution and molten ammonium polyphosphate. The process is taught in U.S. Pat. No. 3,825,414, Lee et al. As shown in Lee et al., supra, in order to add the urea as a concentrated solution, it is necessary to separate the points of entry of the two streams upstream from one another by at least 12 inches to prevent subsequent reaction of said urea with said ammonium polyphosphate. In our invention, urea, when required, is introduced as a solid, such as prills or as a melt or concentrated solution. We have found in our invention no need to introduce the urea or any other fertilizer material in streams separated to prevent decomposition and hydrolysis of the urea.

We have found therefore that the objects of the present invention can be effected by the use of an essentially anhydrous melt of ammonium phosphate which is advantageous in production of granular mixed fertilizer. The ammonium phosphate melt supplies the liquid phase required to bond other fertilizer materials together into granules without the addition of liquids containing water. This eliminates the very expensive and difficult drying step, and thus is important in decreasing investment, energy requirements, and operating costs. Pollution abatement is greatly simplified since the greatest source of fumes and dust is eliminated. The use of the pipe reactor perforated with holes for discharging the ammonium phosphate melt allows improved distribution of the melt onto the solid particles in the granulator, thus decreasing lump and oversize formation, and quite unexpectedly and very simply provides separation of the steam from the melt without the use of a complex mechanical vapor disengager, as in Meline, supra.

Still further and more general objects and advantages of the present invention will appear from the more detailed description set forth below, it being understood, however, that this more detailed description is given by way of illustration and explanation only and not necessarily by way of limitation since various changes therein may be made by those skilled in the art without departing from the true spirit and scope of the present invention.

Thus, the novelty of our process resides in formation of an ammonium phosphate melt which is utilized in the form of a spray to provide liquid phase for granulation of particles of fertilizer materials to produce very homogeneous mixed fertilizer granules and do not require a drying step.

Our invention, together with further objects and advantages thereof will be better understood from a consideration of the following description taken in connection with the accompanying drawing in which:

The FIGURE illustrates that streams of phosphoric acid via line 1 and anhydrous gaseous ammonia via line 2 are introduced into first-stage ammoniation vessel 3, which is operated at atmospheric pressure and from which evaporated water stream 4 is allowed to escape. Partially neutralized acid in line 5 from first-stage vessel 3 is fed by pump 6 to second-stage ammoniator 7, a standard pipe tee followed by a length of standard pipe, where it reacts very rapidly with another stream of gaseous ammonia introduced thereinto at 8. Monoammonium phosphate melt from pipe reactor 7 discharges via line 9 into granulator 10, which can be a rotary drum, a pugmill, or similar-type equipment where the melt coats particles of recycled finely divided product fed to granulator 10 via line 11 and a mixture of solid fertilizer raw materials fed to granulator 10 via line 12 and binds all together to form granules of mixed fertilizer. The most widely used rotary drum granulator is particularly suited to containment of the discharged vapors. Water vapor discharging from pipe reactor 7 at granulator 10 is contained by hood 13 and exhausted by stream 14 by means not shown. Granulator discharge stream 15 is fed to cooler 16, a rotary unit where the granules of mixed fertilizer are contacted with airstream 17 for removal of sensible heat. The cooled material is then introduced into size classifier 18. Undersize and other crushed material are returned to the granulator for control of granulation.

The present invention relates to an improved method for the manufacture of solid mixed fertilizer; more particularly it relates to the manufacture of solid mixed fertilizer directly from the ammoniation of phosphoric acid of the wet-process type; still more particularly it relates to the manufacture of solid mixed fertilizer wherein essentially anhydrous melts of ammonium phosphates, that may contain a substantial amount of polyphosphate, are used to incorporate other fertilizer materials and yield granular products containing $K_2O$ as well as N and $P_2O_5$; and still even more particularly it relates to the manufacture of solid mixed fertilizer wherein the ammonium phosphate melt is formed as an atomized spray discharged from a reaction pipe.

Phosphoric acid of merchant-grade concentration (50–58 percent $P_2O_5$) or low-conversion superphosphoric acid (58–72 percent $P_2O_5$ with 10 to 30 percent as polyphosphate, usually about 68–70) may be used in the process of the present invention to form the ammonium phosphate melt when reacted with anhydrous ammonia vapor. Two stages of ammoniation are used when introducing merchant-grade acid, i.e., no polyphosphate species present in the feed acid. The first-stage ammoniator of our process consists of an open or vented vessel equipped with means of feeding acid and ammonia and with some means of mixing. The design of such widely used ammoniation vessels is well known to those skilled in the art. The second-stage ammoniator of the present process consists of a length of pipe of suitably corrosion-resistant material preceded by a standard pipe tee. Only the second-stage ammoniator (pipe reactor) is needed when low-conversion superphosphoric acid is used. The ammonium phosphate melt formed in the inline reactor is sprayed by reaction steam pressure through the openings in a perforated pipe onto a bed of solids in the granulator. The solids fed to the granulator can consist of urea prills, potassium chloride, as well as various other fertilizer materials and fines recycled from a size classification stage. The granules formed in said granulator are cooled by a stream of air in rotary cooler prior to the size classification step.

In order that those skilled in the art may better understand how the present invention can be practiced, the following examples are given by way of illustration and not necessarily by way of limitation.

EXAMPLE I

Granular mixed fertilizer of the invention containing about 11 percent nitrogen and about 57 percent $P_2O_5$ was produced from only commercial, merchant-grade phosphoric acid and anhydrous ammonia in pilot-scale equipment (production rate 500 pounds per hour) under conditions shown in table I below.

Table I

| Production of Granular 12-57-0 | |
|---|---|
| First-stage ammoniator conditions | |
| Acid feed | |
| Rate, lb/hr | 533 |
| Temperature, °F | 183 |
| $P_2O_5$ content, percent | 55.0 |
| Ammonia feed | |
| Rate, lb/hr | 27 |

Table I-continued

| Production of Granular 12-57-0 | |
|---|---|
| Slurry | |
| Temperature, °F | 281 |
| $NH_3:H_3PO_4$ mole ratio | 0.39 |
| Second-stage ammoniator conditions | |
| Ammonia feed rate, lb/hr | 60 |
| Ammonium phosphate melt | |
| Temperature, °F | 443 |
| Chemical analysis, % | |
| Total N | 11.8 |
| Total $P_2O_5$ | 58.6 |
| $NH_3:H_3PO_4$ mole ratio | 1.02 |
| Granulator conditions | |
| Granulator type | Pugmill |
| Granulator product | |
| Temperature, °F | 218 |
| Screen analysis (wt. %) | |
| +6 mesh | 27 |
| −6 +12 mesh | 33 |
| −12 mesh | 40 |
| Recycle | |
| Ratio, lb/lb product | 4.1 |
| Temperature, °F | 96 |
| Ammonia evolution (wt %) | 10.0 |
| Process product composition (wt %) | |
| Nitrogen | 12.4 |
| Total $P_2O_5$ | 57.0 |
| Polyphosphate $P_2O_5$, % of total $P_2O_5$ | 14.7 |
| Moisture | 0.4 |

EXAMPLE II

Granular mixed fertilizer of the invention containing about 19 percent nitrogen, about 19 percent $P_2O_5$, and about 19 percent $K_2O$ was produced from commercial, merchant-grade phosphoric acid, anhydrous ammonia, prilled urea, and standard potassium chloride in pilot-scale equipment (production rate 1500 lb/hr) under conditions as shown in Table II below.

Table II

| Production of Granular 19-19-19 Grade | |
|---|---|
| First-stage ammoniator conditions | |
| Acid feed | |
| Rate, lb/hr | 526 |
| Temperature, °F | 202 |
| $P_2O_5$ content, % | 53.9 |
| Ammonia feed | |
| Rate, lb/hr | 27 |
| Slurry | |
| Temperature, °F | 293 |
| $NH_3:H_3PO_4$ mole ratio | 0.43 |
| Second-stage ammoniator conditions | |
| Ammonia feed rate, lb/hr | 49 |
| Ammonium phosphate melt | |
| Temperature, °F | 425 |
| Chemical analysis, % | |
| Total N | 10.5 |
| Total $P_2O_5$ | 57.5 |
| $NH_3:H_3PO_4$ mole ratio | 0.93 |
| Granulator conditions | |
| Granulator type | Rotary drum |
| Feed rates to granulator, lb/hr | |
| Ammonium phosphate melt | 494 |
| Ammonia | 18 |
| Urea prills | 507 |
| Potassium chloride | 483 |
| Recycled solids | 2880 |
| Granular product | |
| Temperature, °F | 172 |
| Screen analysis (wt %) | |
| +6 mesh | 9 |
| −6 +12 mesh | 26 |
| −12 mesh | 65 |
| Ammonia evolution (wt %) | 3.9 |
| Process product composition (wt %) | |
| Nitrogen | 20.2 |
| Total $P_2O_5$ | 20.1 |
| Polyphosphate $P_2O_5$, % of total $P_2O_5$ | 18.3 |
| $K_2O$ | 18.3 |
| Moisture | 0.6 |

EXAMPLES III AND IV

Similar data from production of granular mixed fertilizer of 12-24-24 and 15-30-15 are given in Table III below.

Table III

| Production of Granular 12-24-24 and 15-30-15 | | |
|---|---|---|
| Product grade | 12-24-24 | 15-30-15 |
| First-stage ammoniator conditions | | |
| Acid feed | | |
| Rate, lb/hr | 543 | 648 |
| Temperature, °F | 180 | 197 |
| $P_2O_5$ content, % | 54.3 | 53.9 |
| Ammonia feed | | |
| Rate, lb/hr | 27 | 35 |
| Slurry | | |
| Temperature, °F | 290 | 303 |
| $NH_3:H_3PO_4$ mole ratio | 0.42 | 0.54 |
| Second-stage ammoniator conditions | | |
| Ammonia feed rate, lb/hr | 46 | 61 |
| Ammonium phosphate melt | | |
| Temperature, °F | 435 | 429 |
| Chemical analysis, % | | |
| Total N | 11.6 | 11.5 |
| Total $P_2O_5$ | 57.9 | 56.0 |
| $NH_3:H_3PO_4$ mole ratio | 1.02 | 1.04 |
| Granulator conditions | | |
| Granulator type | Rotary drum | Rotary drum |
| Feed rates to granulator, lb/hr | | |
| Ammonium phosphate melt | 509 | 624 |
| Ammonia | 17 | 17 |
| Urea prills | 150 | 202 |
| Potassium chloride | 480 | 310 |
| Recycle solids | 2620 | 4120 |
| Temperature, °F | 178 | 175 |
| Screen analysis (wt %) | | |
| +6 mesh | 33 | 15 |
| −6 +12 mesh | 58 | 49 |
| −12 mesh | 9 | 36 |
| Ammonia evolution (wt %) | 3.5 | 8.6 |
| Process product composition (wt %) | | |
| Nitrogen | 13.4 | 14.9 |
| Total $P_2O_5$ | 25.1 | 32.0 |
| Polyphosphate $P_2O_5$, % of total $P_2O_5$ | 24.3 | 25.0 |
| $K_2O$ | 24.3 | 15.6 |
| Moisture | 1.8 | 1.1 |

EXAMPLE V

Granular mixed fertilizer containing about 13 percent nitrogen and 57 percent $P_2O_5$ was produced from commercial, low-conversion wet-process superphosphoric acid and anhydrous ammonia in pilot-scale equipment (production rate 500 lb/hr) under conditions shown in Table IV below.

Table I

| Production of Granular 13-57-0 | |
|---|---|
| Inline ammoniator conditions | |
| Acid feed | |
| Rate, lb/hr | 440 |
| Temperature, °F | 128 |
| $P_2O_5$ content, % | 68.8 |
| Ammonia feed | |
| Rate, lb/hr | 89 |
| Water feed | |
| Rate, lb/hr | 75 |
| Ammonium phosphate melt | |
| Temperature, °F | 480 |
| Chemical analysis, % | |
| Total N | 11.8 |
| Total $P_2O_5$ | 59.8 |
| $NH_3:H_3PO_4$ mole ratio | 1.0 |
| Granulator conditions | |
| Granulator type | Rotary drum |
| Granulator product | |
| Temperature, °F | 186 |
| Screen analysis (wt %) | |
| +6 mesh | 36 |
| −6 +12 mesh | 61 |
| −12 mesh | 3 |
| Recycle | |
| Ratio, lb/lb product | 6.9 |
| Temperature, °F | 96 |
| Ammonia evolution (wt %) | 6.7 |

Table I-continued

| Production of Granular 13-57-0 | |
|---|---|
| Process product composition (wt %) | |
| Nitrogen | 13.5 |
| Total $P_2O_5$ | 56.8 |
| Polyphosphate $P_2O_5$, % of total $P_2O_5$ | 30.6 |
| Moisture | 0.5 |

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. An improved process for the granulation of mixed fertilizers comprising the steps of introducing a stream of commercial-grade wet-process phosphoric acid containing from about 50 percent to about 58 percent $P_2O_5$ into first-stage reactor means; simultaneously introducing a stream of ammonia into said first reactor means, the proportioning of ammonia and acid so introduced being sufficient to yield an $NH_3:H_3PO_4$ mole ratio in said first-stage reactor means ranging from about 0.3 to about 0.5; simultaneously removing at least a portion of the resulting partially neutralized wet-process phosphoric acid from said first-stage reactor means and introducing said stream into second-stage inline reactor means, said inline reactor means comprising a common pipe-type reactor, said reactor having a plurality of apertures of predetermined size in the side wall thereof juxtaposed the end thereof; simultaneously introducing a second stream of ammonia into said inline reactor means in quantities sufficient to maintain therein a mole ratio of $NH_3:H_3PO_4$ in the range from about 0.9 to about 1.2; contacting said partially neutralized wet-process acid with said second stream of ammonia in said common pipe reactor at about atmospheric pressure and forming at temperatures in the range of about 400° F to about 500° F in said inline reactor means a resulting melt of ammonium phosphate containing from about 5 to about 50 percent of the $P_2O_5$ values therein as polyphosphate; atomizing said melt with expanding water vapor formed by heat of said ammoniation reaction in said inline reactor means and removing at least a portion of said ammonium phosphate melt through said plurality of apertures of predetermined size in the side wall of said inline reactor; spraying said atomized ammonium phosphate melt, by means of the reaction steam pressure, into the upper end of an inclined rotating drum and onto a bed of moving particles maintained therein; simultaneously introducing particles of recycled fines from a later-mentioned sizing step into said rotary drum at the upper end thereof for contact with said ammonium phosphate melt; withdrawing the resulting ammonium phosphate material from the lower end of said drum; introducing said withdrawn material into cooling means; withdrawing the resulting cooled material from said cooling means; introducing said material withdrawn from said cooling means into sizing means; returning particles of predetermined size from said sizing means into the upper end of said drum and withdrawing from said sizing means granular particles of ammonium phosphate as product, said process characterized by the fact that there is substantially no change in the moisture content of said ammonium phosphate between said step of removing same from the lower end of said drum to the recovery of same as product.

2. The process of claim 1 wherein particles or concentrated solutions of fertilizer materials, in addition to the recycled fines, selected from the group consisting of potassium chloride, urea, ammonium sulfate, ammonium nitrate, superphosphate, and mixtures thereof, are introduced into the upper end of said rotating drum for contact with said ammonium polyphosphate melt.

3. The process of claim 2 wherein a pugmill or blunger is utilized instead of a rotating drum as the granulating means.

4. An improved process for the granulation of mixed fertilizers comprising the steps of introducing a stream of commercial-grade wet-process phosphoric acid containing from about 58 to about 72 percent $P_2O_5$ into a common pipe reactor, said reactor having a plurality of apertures of predetermined size in the side wall thereof juxtaposed the end thereof; simultaneously introducing a stream of anhydrous ammonia into said pipe reactor, the proportions of said ammonia and said wet-process phosphoric acid fed thereto being proportioned to maintain therein a mole ratio of $NH_3:H_3PO_4$ in the range of about 0.9 to about 1.2; contacting said stream of ammonia with said stream of phosphoric acid in said common pipe reactor means at about atmospheric pressure to form at temperatures in the range of about 400° F to about 500° F a resulting melt of ammonium phosphate wherein from about 5 percent to about 50 percent of the phosphorus values are converted to the nonortho acyclic species; atomizing said melt with expanding water vapor formed by heat of said ammoniation reaction in said pipe reactor means and removing at least a portion of said ammonium phosphate melt through said plurality of apertures of predetermined size in the side wall of said pipe reactor means; spraying said atomized ammonium phosphate melt into the upper end of an inclined rotating drum and onto a bed of moving particles maintained therein; simultaneously introducing particles of recycled fines from a later-mentioned sizing step into said rotary drum at the upper end thereof for contact with said ammonium phosphate melt; withdrawing the resulting ammonium phosphate material from the lower end of said drum; introducing said withdrawn material into cooling means; withdrawing the resulting cooled material from said cooling means; introducing said material withdrawn from said cooling means into sizing means; returning particles of predetermined size from said sizing means into the upper end of said drum and withdrawing from said sizing means granular particles of ammonium phosphate as product, said process characterized by the fact that there is substantially no change in the moisture content of said ammonium phosphate between said step of removing same from the lower end of said drum to the recovery of same as product.

5. The process of claim 4 wherein particles or concentrated solutions of fertilizer materials, in addition to the recycled fines, selected from the group consisting of potassium chloride, urea, ammonium sulfate, ammonium nitrate, superphosphate, and mixtures thereof, are introduced into the upper end of said rotating drum for contact with said ammonium polyphosphate melt.

6. The process of claim 5 wherein a pugmill or blunger is utilized instead of a rotating drum as the granulating means.

* * * * *